Oct. 2, 1928.
G. D. BRADSHAW
FLUID SEPARATOR
Filed May 12, 1927
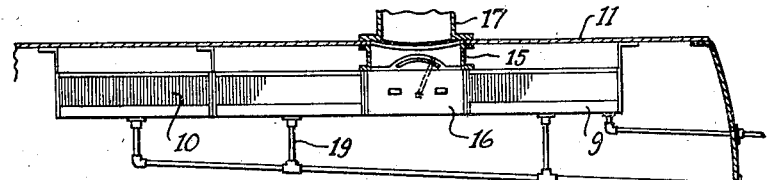
Fig. 1
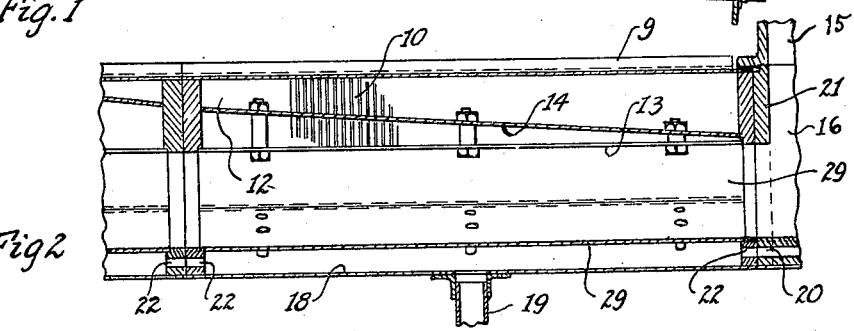
Fig. 2
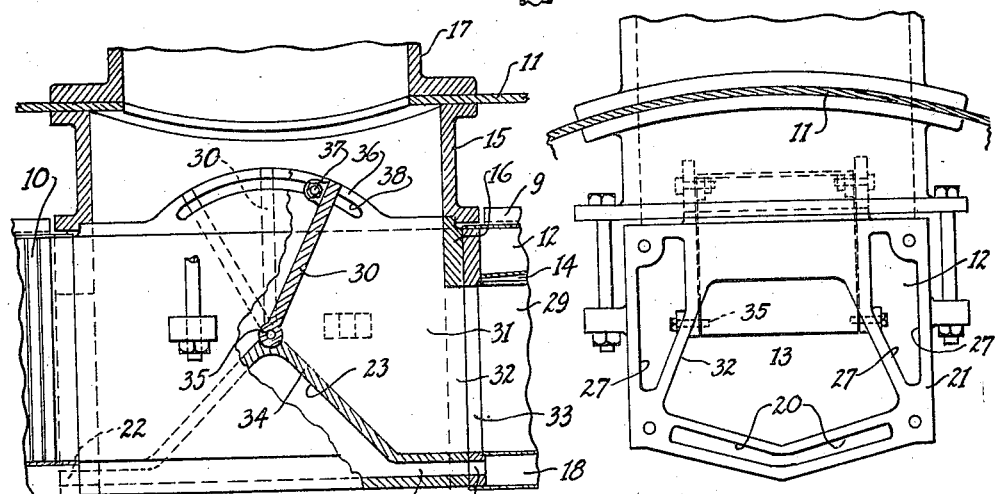
Fig. 3
Fig. 4
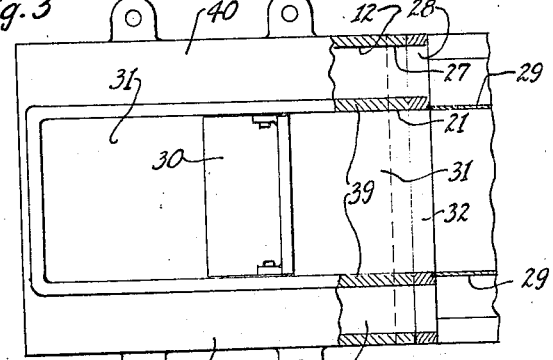
Fig. 5
INVENTOR:
Grant D. Bradshaw
By
Atty.

Patented Oct. 2, 1928.

1,686,067

UNITED STATES PATENT OFFICE.

GRANT D. BRADSHAW, OF PITTSBURGH, PENNSYLVANIA, ASSIGNOR TO BLAW-KNOX COMPANY, OF BLAWNOX, PENNSYLVANIA, A CORPORATION OF NEW JERSEY.

FLUID SEPARATOR.

Application filed May 12, 1927. Serial No. 190,723.

This invention relates to fluid separators, and particularly those used for purifying gases by separating from the gases liquid particles or other impurities. It has for one of its objects providing means for increasing the efficiency and capacity of the separators by reducing the tendency towards counter-currents and eddy currents, and in general to more completely equalize the flow of the fluids through the various portions of the separator.

Although the invention is applicable to various types of separators used for various purposes, yet for the purpose of illustrating my invention I have described it as applying to steam separators used for drying and purifying the steam in boilers and particularly to that type of separator known by the trade as "Tracyfiers".

Of the accompanying drawings Fig. 1 is an elevation of a separator mounted in a boiler, which embodies the features of my invention; Fig. 2 is an enlarged central sectional elevation of one of the sections of the purifier; Fig. 3 is a further enlarged similar elevation of the T and outlet of the separator connected to a boiler; Fig. 4 is an end view of the T and outlet; and Fig. 5 is a plan view of the T.

As is well understood, separators 9 of this nature are mounted in a boiler 11, and comprise a system of baffles 10 which are mounted in the sides or other parts of the casing of the separator sections; and a steam or gas passageway 12 is provided through which the gas flows from the baffles into an inner conduit 13 through a slot 14. From the conduit 13 the gas flows to the outlet 15 of the separator, through a T 16, and thence to the gas or steam main 17 of the system. The moisture and impurities which are separated from the gas flow downwardly into a liquid chamber 18, and are then drained off through pipes 19 in any suitable manner.

I have found, particularly when long separators such as are illustrated in Fig. 1, are installed in boilers, or elsewhere, with the outlet 15 positioned a material distance from one end, and especially when there are sections of the separator on each side of the outlet, that there is a tendency for eddy currents or counter-currents to be set up both in the steam passageways 12 and 13 and in the water passageways 18. In case of the water passageways 18 the water may flow more freely from one of the sections connecting with the T 16 than from the section on the other side of the T, particularly so if there are more sections on one side of the T than on the other.

In my copending patent application, Serial No. 114,063, filed June 7, 1926, I have described a separator of this nature, and have disclosed various openings therein between the separator sections for equalizing the flow of steam and water through the passageways of the separator. This application is in part a division of that application as to some features.

To equalize the pressure on the two sides of the T I provide openings 20 in the end plate 21 of the T, these openings registering with openings 22 in the adjacent end plates of the sections which are connected to the T. Also in the T itself a suitable water chamber 23 is provided connecting the openings 20 at each end of the T. In this manner the pressure is equalized in the two sections adjacent to the T, as well as in the T itself; and water is free to flow from one section to the other if the pressures are temporarily unequal, and thus to prevent clogging of the water passageways under any exceptional or abnormal conditions. Similar openings 22 in the other ends of the sections provide passageways for the water to flow from one separator section to the other in case of two connected sections.

Likewise, to equalize the pressure in the steam passageways 12, which are formed between the baffles and the inner steam conduit 13, I provide corresponding passageways 12 in the T and I also provide openings 27 in the end plates of the T and corresponding registering openings 28 in the adjacent end plates of the sections which are connected to the T. In this manner the gas pressure in the passageways 12 of the sections and T is equalized, and various eddy currents and counter-currents are eliminated. Also, if the gas pressure on one side of the T becomes greater than on the other side the openings 27 and 28 will allow flow from one portion of the separator to the other and the pressure is thus equalized.

It is to be understood that the passageways 12 extend continuously through the separator from one end to the other. These passageways in the separator sections are separated from the inner conduit 13 by means of plates 29 on the sides and bottom of the conduit. The inner conduit communicates with chambers 31 in the T, which in turn communicate with the outlet 15. But the passageways 12 in the T are separated from the chambers 31 by a plate 39 on each side of the chambers 31 and plates 40 separate the passageways 12 from the outlet 15. Hence, all of the steam passing from the baffles into the inner conduit passes through the slots 14.

An adjustable plate 30 is pivoted on pivots 35 between the chambers 31, and, by means of flanges 36, having arcuate slots 38, and bolts 37, the plate 30 may be positioned to suit the needs of the gas flowing through the T.

I claim as my invention:

1. A steam separator comprising a T outlet, steam separator sections connected to said outlet on each side thereof, a water passageway in each of said sections, and a water passageway in said T outlet connecting the passageways in said sections.

2. A steam separator as claimed in claim 1, each of said sections having a steam passageway, and having a steam conduit in said passageway, said T having a steam passageway and a steam chamber, the steam passageway and the steam conduit of each of the sections opening respectively into the respective steam passageway and steam chamber of the T.

3. A steam separator comprising a member having a steam outlet on one side and a steam inlet on two other sides, a steam chamber connecting said inlets with said outlet, a steam separator section connected to said member on each of the inlet sides, each section having an inner steam conduit communicating with said chamber, said member having a steam passageway extending from one of the inlet sides to the other, and each of the sections having a steam passageway communicating with said steam passageway of said member.

4. A steam separator as claimed in claim 3, in which each of said sections has a steam opening connecting its steam passageway with its steam conduit.

5. A steam separator as claimed in claim 3, in which each of said sections has a water passageway beneath said conduit, and said member has a water passageway connecting the water passageways of said sections.

6. A steam separator comprising a plurality of individual sections, each of said sections having an inner steam passageway and a water passageway extending from one end to the other, both of the passageways in each section communicating with the respective corresponding passageways in the adjacent section, and an inner conduit in each section within said steam passageway, each of the conduits communicating with the conduit of the adjacent section.

7. A steam separator comprising a plurality of individual sections, each of said sections having an inner steam passageway and a water passageway extending from one end to the other, both of the passageways in each section communicating with the respective corresponding passageways in the adjacent section, and an outlet T between two of said sections having a steam passageway and a water passageway communicating with the respective corresponding passageways of each of the adjacent sections.

8. A steam separator consisting of a plurality of sections, each section comprising an elongated casing with open sides, purifying baffles mounted in said sides, a steam passageway inside of said baffles, a water passageway beneath said steam passageway, and a T outlet positioned between two of said sections, said T having a steam passageway extending from one side to the other and communicating with the steam passageway of each of the adjacent sections.

9. A steam separator as claimed in claim 8 in which said T outlet has a water passageway extending from one side to the other and communicating with the water passageway in each of the adjacent sections.

In testimony whereof, I hereunto set my hand.

GRANT D. BRADSHAW.